(12) United States Patent
Mann

(10) Patent No.: US 8,420,841 B2
(45) Date of Patent: Apr. 16, 2013

(54) METHODS AND SYSTEMS TO PRODUCE BIODIESEL FUEL

(75) Inventor: Uzi Mann, Lubbock, TX (US)

(73) Assignee: Texas Tech University System, Lubbock, TX (US)

(*) Notice: Subject to any disclaimer, the term of this patent is extended or adjusted under 35 U.S.C. 154(b) by 310 days.

(21) Appl. No.: 12/880,222

(22) Filed: Sep. 13, 2010

(65) Prior Publication Data
US 2011/0061289 A1    Mar. 17, 2011

Related U.S. Application Data

(60) Provisional application No. 61/242,540, filed on Sep. 15, 2009.

(51) Int. Cl.
C11C 3/00    (2006.01)
C11C 3/04    (2006.01)
C10L 1/18    (2006.01)
C10L 1/19    (2006.01)

(52) U.S. Cl.
USPC .............. 554/169; 554/1; 554/124; 554/161; 554/163; 44/308

(58) Field of Classification Search ........................ None
See application file for complete search history.

(56) References Cited

U.S. PATENT DOCUMENTS
6,884,900 B2    4/2005  Maeda et al.
2009/0038209 A1*  2/2009  Farid et al. ............... 44/308

FOREIGN PATENT DOCUMENTS
EP    1411042 A1    4/2004

* cited by examiner

Primary Examiner — Yate K Cutliff
(74) Attorney, Agent, or Firm — Hitt Gaines, P.C.

(57) ABSTRACT

A method of manufacturing a biodiesel fuel that comprises generating micro-droplets of a first reactant and mixing the micro-droplets of the first reactant with a second reactant that is substantially immiscible with the first reactant. The method also comprises transferring the mixture of the first reactant and second reactant into a transesterification reaction vessel. The first reactant is one of an alcohol or oil, and the second reactant is the other of the oil or the alcohol.

6 Claims, 5 Drawing Sheets

METHODS AND SYSTEMS TO PRODUCE BIODIESEL FUEL

CROSS-REFERENCE TO RELATED APPLICATION

This application claims the benefit of U.S. Provisional Application Ser. No. 61/242,540, filed on Sep. 15, 2009, to Uzi Mann, entitled, "METHODS AND SYSTEMS TO PRODUCE BIODIESEL FUEL;" which are all commonly assigned with this application and incorporated herein by reference in their entirety.

TECHNICAL FIELD

The present disclosure is directed, in general, to biodiesel manufacturing processes and systems to facilitate such manufacturing.

BACKGROUND

Biodiesel fuel is typically produced via transesterification, by reacting various plant and animal oils and fats with low molecular weight alcohols (e.g., methanol, ethanol). Often, the transesterification reaction is catalyzed by adding bases (e.g., NaOH, KOH) to the alcohol, and, using an excess amount of alcohol. Batch production processes often include mixing the oil or fat, the alcohol, and the catalyst in a large reaction tank. After a sufficient reaction time has passed, the biodiesel fuel that is produced is separated from the other reaction product (e.g., glycerol) and the unreacted starting materials (e.g., alcohol and catalyst).

The use of existing processes and systems, however, can result in undesirably long reactions times to substantially complete the transesterification reaction, or, can have unacceptably high inputs of energy to speed up the reaction. Existing processes and systems can also require an undesirably long time to separate the biodiesel fuel from the other reaction products and the unreacted starting materials.

Accordingly, what is needed in the art is a biodiesel fuel production method and system that does not suffer from the disadvantages associated with conventional methods, as discussed above.

SUMMARY

To address the above-discussed deficiencies, the present disclosure provides in one embodiment, a method of manufacturing a biodiesel fuel. The method comprises generating micro-droplets of a first reactant and mixing the micro-droplets of the first reactant with a second reactant that is substantially immiscible with the first reactant. The method also comprises transferring the mixture of the first reactant and second reactant into a transesterification reaction vessel. The first reactant is one of an alcohol or oil, and the second reactant is the other of the oil or the alcohol.

Still another embodiment of the disclosure is another method of manufacturing biodiesel fuel. The method comprises mixing a co-solvent, a first reactant and a second reactant together in a mixing chamber to form a homogeneous solution. The first reactant and the second reactant are substantially immiscible with each other in the absence of the co-solvent. The first reactant is one of an alcohol or oil, and the second reactant is the other of the oil or the alcohol. The method further comprises transferring the homogeneous solution into a transesterification reaction vessel. The first reactant is one of an alcohol or oil, and the second reactant is the other of the oil or the alcohol.

Yet another embodiment of the disclosure is another method of manufacturing biodiesel fuel. The method comprises performing a transesterification reaction between a reactant mixture including alcohol and oil at a temperature that is greater than the normal boiling point of the alcohol. The method further comprises transferring biodiesel fuel and glycerol transesterification reaction products and a remainder of the reactant mixture into a flash tank. The method also comprises flashing vapors of the alcohol out of the flash tank and transferring a remaining content of the flash tank into a separation vessel. The first reactant is one of an alcohol or oil, and the second reactant is the other of the oil or the alcohol.

Another embodiment of the disclosure is a biodiesel fuel manufacturing system. The system comprises an atomizer configured to generate micro-droplets from a first reactant passed through the atomizer. The system also comprises a mixing vessel configured to receive the micro-droplets of the first reactant and combine the micro-droplets with a second reactant to form a reactant mixture. The system further comprises a reaction vessel configured to receive the reactant mixture and convert the reactant mixture into a reaction product that includes a biodiesel fuel in a transesterification reaction. The first reactant is one of an alcohol or oil, and the second reactant is the other of the oil or the alcohol. The first reactant is substantially immiscible with the second reactant.

Yet another embodiment of the disclosure is another biodiesel fuel manufacturing system. The system comprises a mixing vessel configured to form a homogeneous reactant solution of a co-solvent, alcohol and oil. The system also comprises a delivery system configured to deliver the co-solvent, the alcohol and the oil to the mixing vessel. The system further comprises a reaction vessel configured to receive the homogeneous reactant solution and convert the homogeneous reactant solution into a reaction product that includes a biodiesel fuel in a transesterification reaction. The alcohol and the oil are substantially immiscible with each other in the absence of the co-solvent.

Still another embodiment of the disclosure is another biodiesel fuel manufacturing system. The system comprises a reaction vessel configured to perform a transesterification reaction between a reactant mixture that includes an alcohol and oil, the reactant mixture being maintained at a temperature that is greater than a normal boiling point of the alcohol. The system also comprises a flash tank fluidly coupled to the reaction vessel. The flash tank is configured to receive biodiesel fuel and glycerol transesterification reaction products and remaining the reactant mixture. The flash tank can be configured to flash vapors of the alcohol out of the flash tank. The system also includes a separation vessel fluidly coupled to the flash tank, the separation vessel configured to receive a remaining content of the flash tank into the separation vessel.

Another aspect of the present disclosure is a biodiesel fuel that is manufactured by anyone of the above described methods or systems.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure.

Those skilled in the art should also realize that such equivalent constructions do not depart from the scope of the disclosure.

BRIEF DESCRIPTION OF THE DRAWINGS

For a more complete understanding of the present disclosure, reference is now made to the following detailed description taken in conjunction with the accompanying FIGUREs. It is emphasized that various features may not be drawn to scale. In fact, the dimensions of various features may be arbitrarily increased or reduced for clarity of discussion. Reference is now made to the following descriptions taken in conjunction with the accompanying drawings, in which.

DETAILED DESCRIPTION

Figure 1:
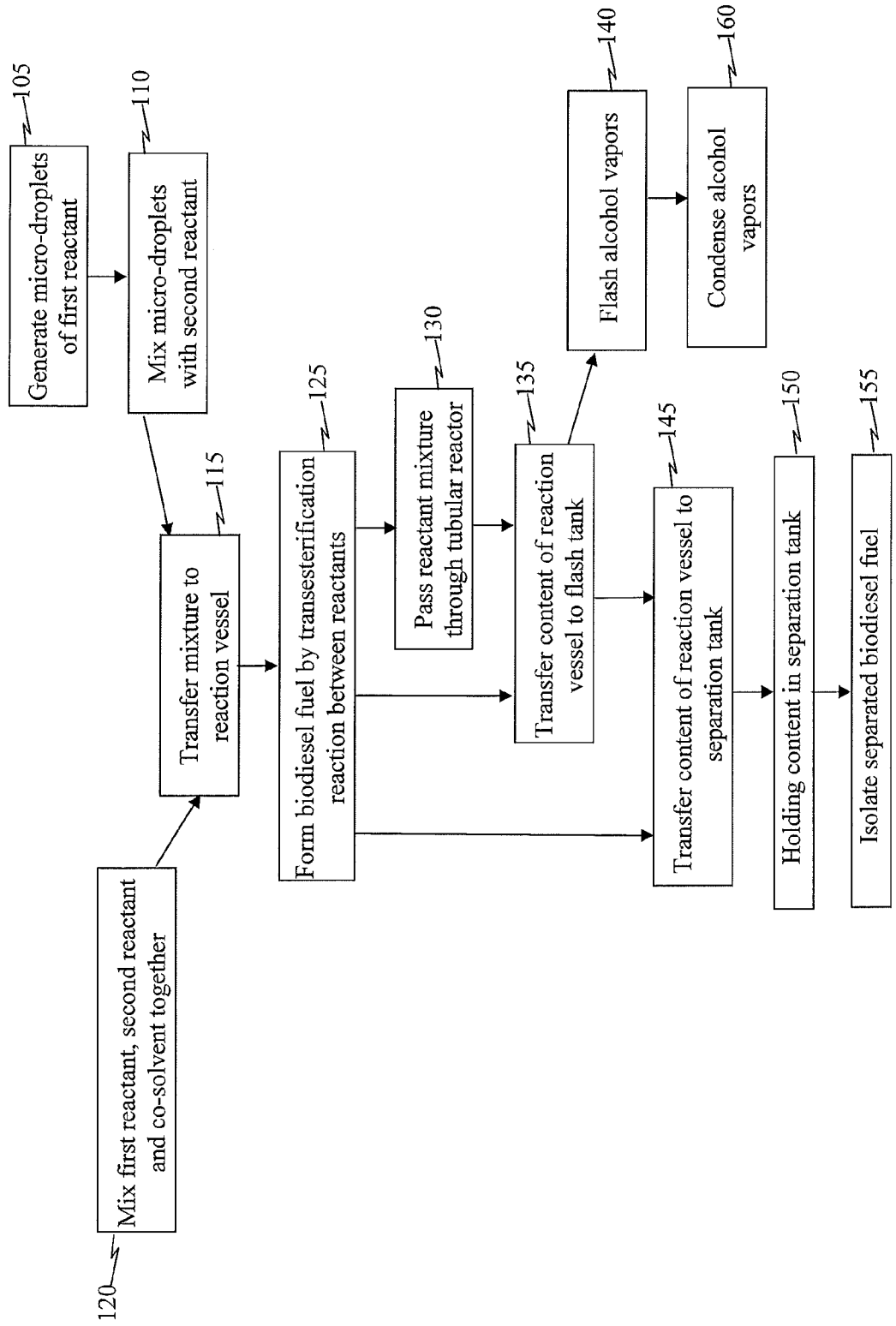
FIG. 1 illustrates by flow diagram, selected aspects of example methods of manufacturing a biodiesel fuel according to the principles of the present disclosure.

The term oil as used herein refers to any glyceride of a fatty acid (e.g., mono-, di-, or triglycerides) that is capable of being converted into esters of the fatty acid by a transesterification reaction. The term oil as used herein includes solid or liquid state material at room temperature. The term oil as used herein can include oils from any of animal, plant or synthetically-derived sources. The term alcohol as used herein refers to one or more compounds in which a hydroxyl group, (—OH), is attached to a saturated carbon atom. Methanol and ethanol are non-limiting examples of suitable alcohols.

Aspects of the present disclosure benefit from the recognition that biodiesel fuel is generated by a chemical reaction between a first reactant (e.g., one of oil or alcohol) and a second reactant (e.g., the other of alcohol or oil) that are substantially immiscible with each other, and, that the reaction rate is transport limited. Therefore, the reaction rate can be rate-limited by the interfacial area between the two immiscible reactants. In some conventional reactors, this interfacial area is often formed by a mechanical mixer (e.g. a shear agitator) that generates droplets of one of these reactants in the other reactant. The limited interfacial area limits the transesterification reaction rate.

Aspects of the present disclosure benefit from the recognition that the interfacial area per unit volume of reactant mixture is inversely proportional to the size of the droplets of the reactant that are dispersed in the other reactant. In some small-volume reactors (e.g., volumes less that of about 40 liters), mechanical-mixing sufficient to cause high shear can be readily achieved, and small droplets can thereby be formed. In larger, production-size reactors (e.g., volumes of about 4000 liters or larger), however, the formation of similar sized small droplets may not be practical because of the higher power costs associated with achieving similar degrees of shear as in the small-volume reactors. Consequently, the reaction rate in larger, production-size reactors, provide much slower reaction rate than in small-volume reactors. Thus, because longer reaction times are needed, the cost of biodiesel fuel production is higher.

Some embodiments of the present disclosure address these problems by generating a dispersion of fine micro-droplets for at least one of the reactants (e.g., one of oil or alcohol reactants) in a mixing chamber with the other reactant (e.g., the other of the alcohol or oil). The term micro-droplet, as used herein, refers to a fluid droplet (e.g., liquid droplets) of the first or second reactants that have an average diameter of about 100 microns or less. This mixture with the micro-droplets dispersed therein (e.g., in the other reactants) is then introduced into a reaction vessel where a transesterification reaction occurs. Generating a dispersion of fine micro-droplets of a reactant prior to the mixture being introduced into a reaction vessel can substantially increase the transesterification reaction rate as compared to the rate where the reactants are only mechanically-mixed in the reaction vessel.

Other embodiments of the present disclosure address the above-described problems by adding a co-solvent to make the first and second reactants (e.g., alcohol and oil, respectively) more (and in some cases, completely) miscible with each other. Because the miscibility between the first and second reactants is increased, the transesterification reaction rate is less (and in some embodiments, no longer) transport-limited because there is direct contact between the two reactants (e.g., without the presence of the above-described interfacial area). Consequently, the rate of the transesterification reaction is increased. In some preferred embodiments, the co-solvent is the biodiesel fuel that would be produced from the transesterification reaction between the first and second reactants.

A potential disadvantage of including a co-solvent such as biodiesel in the reactant mixture is that the co-solvent can be an inert species that occupies volume as it passes through reactor vessel. Therefore a larger reactor volume may be required to achieve the desired reaction time. In practice, however, this disadvantage is outweighed by the enhanced reaction rate associated with eliminating the need for generating large interfacial areas between the reactants.

Aspects of the present disclosure also benefit from the recognition that conducting the transesterification reaction at higher temperatures can greatly increase the rate of the reaction, at least when the reaction is not transport limited. For the purposes of the present disclosure, a higher temperature is defined as being at least about 5° C. higher than the normal boiling point (e.g., the normal boiling point at 1 atmosphere of pressure) of the alcohol (or multiple different alcohols) used as one of the reactants. In some conventional processes, where the transesterification reaction is transport-limited, due, e.g., to the small interfacial area between the two reactants, although such high temperatures would be expected to substantially increase the intrinsic reaction rate, the higher rate cannot be realized because of the above-discussed transport limitation. Additionally, in some conventional reaction processes, one may expect that the use of such high temperatures is undesirable because of large amounts of energy that may be needed to heat the reaction vessel (e.g., a production-size reaction vessel), or, because undesirably bulky reaction vessels are needed to contain the high pressures generated inside the vessel (e.g., thick vessel walls to withstand higher pressures). Therefore one might expect there to be little motive to spend the energy needed to produce such higher temperatures. In light of the present disclosure, however, this expectation is incorrect. The expectation is incorrect at least because the transport limitations can be substantially overcome and because a large portion of the heat added to the reactor can be recovered through the heat exchanger.

Additionally, aspects of the present disclosure also benefit from the recognition that the transesterification is a reversible, slightly endothermic reaction. Hence, the conversion of the transesterification reaction is limited by the reaction equilibrium. Conducting the transesterification reaction at higher temperatures favorably shifts the equilibrium towards the desired biodiesel fuel reaction product, thereby enhancing the yield of biodiesel fuel.

Some embodiments of the present disclosure address the above-described problems by using a tubular reaction vessel. The tubular reactor can be configured to be uniformly heated along all, or a portion of, the length of the reaction tube. The tubular reactor can also be configured to withstand the high pressures (e.g., up to about 70 atmospheres) that can coincide with high temperatures. A benefit from using high pressure is that the high pressure can prevent the evaporation of the alcohol inside the reactor, and keep the alcohol mixed in the reacting fluid. The reaction mixture transferred into the tubular reaction vessel can be the above-described mixture with micro-droplets dispersed therein, or, with the co-solvent included therein. Because the transesterification reaction of such mixtures is much faster than in some convention processes, the biodiesel fuel can be produced as the mixture is continuously flowing through the tubular reaction vessel.

Aspects of the present disclosure also benefit from the recognition that the use of high temperature reaction mixtures can improve the separation of the biodiesel product from other reaction products, or, remaining reactants. For instance, in some cases the use of a high temperature reaction mixture enables the removal of the alcohol in a step, prior to and different from, separating the biodiesel fuel from the other reaction products. For example, in some embodiments, the unreacted alcohol leaving the reaction vessel is removed to a flash tank. By removing the excess unreacted alcohol from the material leaving in the reaction vessel, the separation of the biodiesel product from glycerol in a subsequent separation step is improved. It was discovered that in the absence of the unreacted alcohol, the glycerol is more rapidly separated from the other reaction products (including biodiesel), as compared to cases where the alcohol was present. For instance, in some cases, the separation can be substantially completed in minutes or a few hours instead of a day or more.

By contrast, in some conventional processes, after the transesterification reaction is substantially completed, the material from the reaction vessel (including unreacted alcohol) is transferred to a separation vessel. In the separation vessel the biodiesel fuel product, other reaction products (e.g., glycerol) and remaining reactants (e.g., excess unreacted alcohol) are allowed to separate based upon their different densities. Because the alcohol is dissolved in the glycerol phase, thus reducing the density of this mixture, the biodiesel fuel separation process can take a day or more, thereby slowing the rate of producing the biodiesel fuel in a useable form.

Additionally, to re-use the unreacted alcohol, the alcohol should be removed from the glycerol in a separate step, which in certain conventional processes, requires additional heating and separation procedures. Certain embodiments of the present disclosure address this problem by condensing the alcohol vapor removed in the flash tank and re-using this alcohol in subsequent biodiesel fuel manufacturing processes, without the need for spending additional time and energy to separate the alcohol and glycerol.

In some conventional processes, the excess alcohol is not removed before separating the biodiesel fuel, because it is thought that in the absence of the excess unreacted alcohol, the reverse of the transesterification reaction would occur, thereby resulting in a loss in the yield of biodiesel fuel. As part of present disclosure, however, conditions were discovered where this reverse reaction doesn't substantially occur.

As noted above, in some embodiments, the transesterification reaction is carried out at a high temperature, and the temperature of the material in the reaction vessel is above the normal boiling point of the alcohol (e.g., the normal boiling point at 1 atmosphere pressure). After completing the reaction, instead of transferring the content of the reaction vessel directly to a conventional separation vessel, the content is transferred to a flash tank.

The flash tank can be equipped with a flash valve that can be configured to reduce the pressure to nearly atmospheric pressure, resulting in the evaporation of the alcohol. The alcohol vapors can be removed to a condenser. After substantially removing the unreacted alcohol, the remaining material from the reaction vessel is transferred to the separation vessel. In some embodiments, the remaining material can be cooled by passing a stream of remaining material through a heat exchanger which can use the heat from the remaining reactant material to heat the mixture of reactants before being fed into the reactor. It is thought that because the remaining material's temperature is reduced in the flash tank, and in the optional heat exchange, and because the glycerol and biodiesel fuel are rapidly separated from each other, the reversal of the transesterification reaction does not substantially occur.

FIG. 1 illustrates by flow diagram, selected aspects of example methods of manufacturing a biodiesel fuel according to the principles of the present disclosure. The method comprises a step 105 of generating micro-droplets of a first reactant (e.g., one of alcohol or oil), and, a step 110 of mixing the micro-droplets of the first reactant with a second reactant (the other of oil or alcohol) that is substantially immiscible with the first reactant. The term substantially immiscible as used herein means that less than about 100 ml of the first reactant can be dissolved in 1000 ml of the second reactant at a standard temperature of 20° C. and 1 atmosphere pressure. The method also comprises a step 115 of transferring the mixture of the first reactant and second reactant (e.g., with the micro-droplets dispersed therein) into a transesterification reaction vessel.

In some embodiment, generating the micro-droplets in step 105 and mixing the micro-droplets of the first reactant with a second reactant in step 110 can be accomplished by stirring a mixture of the first reactant and second reactant in the mixing vessel, e.g., using a low-shear mixer. However, as discussed above, the energy efficient generation of micro-droplets in this manner can sometimes be limited to volumes of about 40 liters or less.

In some preferred embodiments, generating the micro-droplets in step 105 can include passing a liquid of the first reactant through an atomizer to thereby produce micro-droplets. The atomizer can be an ultrasonic atomizer, pressure atomizer, pneumatic atomizer, disc atomizer, or other atomizers that are well-known to those skilled in the art.

In some embodiments, it is advantageous to use an ultrasonic atomizer because the power required to generate the micro-droplets is lower than for other types of atomizers. In addition, ultrasonic atomizers can generate narrowly-distributed droplets whose diameter is easily controlled (e.g., by the atomizer frequency). Ultrasonic atomizers can generate a lower velocity spray of micro-droplets, thus facilitating the use of a smaller mixing volume space than some other types of atomizers.

Using ultrasonic atomizer in the present disclosure is in contrast to using ultrasonic device to vibrate the reactor vessel that has been filled with the two liquid reactants of oil or fat plus alcohol. Vibrating the reactor vessel itself sufficiently to increase the transesterification reaction rate could become increasingly difficult and more expensive as the reactor volume is increased. At some point, for some very large reactors, it is expected that the energy required for the vibration would exceed the energy value of the biodiesel fuel that is produced.

As noted above, in cases where the transesterification rate is transport limited, the size of the micro-droplets can strongly influence the time needed to substantially complete the reaction. As also noted, it is sometimes advantageous to use an ultrasonic atomizer in step 105, because the ultrasonic atomizer can finely control the production of micro-droplets to be within a narrow size range by adjusting the vibrating frequency of the ultrasonic atomizer, and thereby control the transesterification reaction. For example, the lower the frequency of vibration, the larger the size of the micro-droplet. For example, in some embodiments using a vibration frequency of about 20 kHz frequency, the average diameter of micro-droplets can be with a narrow range of about 40 microns. For example, the micro-droplets can have an average diameter in a range of about 40 to 100 microns, when a 20 kHz atomizer is used. For example, using a higher frequency (e.g., about 40 kHz) can produce micro-droplets with an average diameter of about 20 microns.

In some embodiments, it is advantageous to generate the micro-droplets of alcohol in step 105. For instance, because alcohol generally has a lower viscosity than oil, it can take relatively less energy to pass large volumes of alcohol through one of the above-described atomizers as compared to oil. In some embodiments, for example, the first reactant of alcohol can be passed through the ultrasonic atomizer at flow rates up to about 20 liters per minute. In other embodiments, however, the oil can be heated to decrease its viscosity and then passed through an atomizer to produce micro-droplets. In still other embodiments, both micro-droplets of both the first or second reactant (or both) can be generated in step 105.

In other embodiments, it can be advantageous to use a pressure atomizer to generate the micro-droplets in step 105 because these types of atomizers can be more energy efficient at processing higher flow rates of the first reactant. For instance, the first reactant of alcohol can be passed through the ultrasonic atomizer at flow rates of greater than 20 liters per minute. The size of the droplets can be controlled by configured the opening of the nozzle of the pressure atomizer, although the use of a smaller opening to produce smaller-sized droplets may limit the flow rate. However, pressure atomizers with multiple nozzles can be employed to increase the flow rate, if desired. The one potential disadvantage of the pressure atomizers, however, is that a broader size range of micro-droplets may be generated than when using an ultrasonic atomizer. Alternatively, a pneumatic atomizer or a disc atomizer can be used to handle high flow rates of the atomized liquid. Embodiments of the pneumatic atomizer can be equipped with a side-inlet coupled into the flow of the reactant through the nozzle, through which one can apply a pressurized gas, such as air. The greater the flow of air through the side-inlet, the smaller the size of the micro-droplet. One beneficial feature of the disc atomizer is that its output of micro-droplets may cover a very large volume, and so it can be more desirable to apply to large volume mixing tanks (e.g., about 40 liters or more, and in some cases 40,000 liters or more).

In some embodiments, the mixing step 110 includes stirring first reactants and second reactants together to form a substantially uniform dispersion of the micro-droplets of first reactants in the second reactants. The term substantially uniform dispersion as used herein means that the same concentration of droplets exists throughout the volume of the dispersion. For instance, in some cases, the concentration of droplets in the top $\frac{1}{10}$ percent of the tank is the same ($\pm$10 percent) as in the bottom $\frac{1}{10}$ of the tank. In some preferred embodiments, mixing is achieved using an external circulating pump. In other cases, the mixing step 110 can be achieved using a mixing vessel having a stirring blade, propeller or other moveable stirring means. In some cases, the mixing vessel is a static mixer and mixing is achieved by static mixing.

FIG. 1 also illustrates another embodiment of the method, in which there is no need for micro-droplet to be generated and mixed with the other reactant, in accordance with steps 105 and 110. Such embodiments of the method comprise a step 120 of mixing a co-solvent, a first reactant and a second reactant together in a mixing chamber to form a homogeneous solution. In some preferred embodiments, the co-solvent, a first reactant and a second reactant are mixed in step 110 using a static mixer. Such embodiments of the method also comprise the step 120 of transferring the mixture of the first reactant and second reactant (e.g., the homogeneous solution) into the transesterification reaction vessel.

The first reactant (e.g., one or alcohol or oil) and second reactant (e.g., the other of oil or alcohol) are substantially immiscible with each other in the absence of the co-solvent. The term homogenous solution as used herein means that all components are retained in a single phase. For instance, one or more of the components do not separate into different phases even when the solution is left stationary for an extended period of time (e.g., 24 hours). For instance, in some cases, a homogenous solution is provided when at least one liter of the first and second reactants (where the molar ratio of alcohol:oil is about 6:1) is mixed with 2 liters of the co-solvent to form about 3 liters of the homogenous solution, the mixing taking place at a temperature of about 20° C. and pressure of 1 atmosphere.

In some embodiments, the co-solvent includes or is a biodiesel fuel. For instance, in some cases the biodiesel fuel used as the co-solvent is a transesterification reaction product of the first reactant and the second reactant. This has the advantage of not requiring additional steps and expense to provide or recover the co-solvent. In other cases, however, a different biodiesel fuel, produced from the transesterification of different reactants, can be used as the co-solvent. In view of the present disclosure, one skilled in the art would appreciate that other types of co-solvent can be used.

In some embodiments, it is desirable for the initially formed homogenous solution to be substantially free of glycerol (e.g., less than 0.01 moles of glycerol per mole of alcohol or oil). The presence of glycerol in the homogenous solution could promote the reversal of the transesterification reaction in the reaction vessel, thereby reducing yields of biodiesel fuel production and the purity of the biodiesel fuel product.

In some embodiments, the proportions of the first reactant of alcohol and second reactant of oil are provided such that the mixture transferred to the reaction vessel in step 115 has an alcohol:oil molar ratio of at least about 3:1. In some embodiments it is desirable to have a stoichiometric excess of alcohol because this can increase the rate of the transesterification reaction and enhance the equilibrium conversion. For instance, in some cases, the alcohol-to-oil molar ratio ranges from more than about 3:1 to less than about 9:1, and more preferably, equal to about 6:1.

FIG. 1 further illustrates that embodiments of the method can further include a step 125 of forming the biodiesel fuel in the reaction vessel by performing the transesterification reaction on a reactant mixture. In some embodiments, the transesterification reaction in step 125 is performed at a standard temperature of 20° C. and pressure of 1 atmosphere. In other embodiments, transesterification reaction in step 125 is performed at a temperature that is greater than the normal boiling point (e.g., the normal boiling point at 1 atmosphere pressure), of the alcohol corresponding to the first or second reactant. In a sealed reaction vessel, an elevated pressure (e.g., greater than 1 atmosphere), that should be present concurrent with the elevated temperature, can help to hold the alcohol in the liquid reactant mixture. For instance, some embodiments of the transesterification reaction carried out in step 125 (e.g., using methanol as the first reactant) can be performed at a temperature in the range from 70 to 150° C. and a pressure in the range from about 2 to 20 atmospheres.

In some embodiments, the reactant mixture in the reaction vessel also includes a catalyst such as a base (e.g., NaOH, KOH or similar inorganic bases or organic bases). In some preferred embodiments, the reactant of alcohol includes the catalyst. However, it is possible that base can be separately introduced into the reaction vessel, or can be included in the mixture transferred in step 115, or can be included with the second reactant of oil.

In some embodiments forming the biodiesel fuel in step 125, includes a step 130 of passing the mixture transferred in step 115, through a tubular reactor of the reaction vessel. Benefits from using a tubular reactor have been discussed elsewhere herein. In some embodiments, a continuous flow rate of the reactant mixture through the tubular reactor can be about 1.7 liters/minute and the tubular reactor can have a diameter of about 0.08 meter and a length of about 7 meters.

FIG. 1 further illustrates that some embodiments of the method can further include a step 135 of transferring the content of the reaction vessel into a flash tank. For instance, the content of transesterification reaction products (e.g., biodiesel fuel and glycerol) and remaining reactant mixture are transferred in step 135.

Some embodiments of the method can also include a step 140 of flashing vapors of the alcohol out of the flash tank. The alcohol is in a vapor-phase because the temperature of the material from the reaction vessel is still above the boiling point of the alcohol and the pressure in the flash tank is reduced to near atmospheric pressure, e.g., by means of the flash valve. In some cases, the vapor-phase alcohol can be collected in a condenser tank and re-used as a reactant in future transesterification reactions (e.g., re-used as part of the mixture formed in step 110 or step 120). In some preferred embodiments (e.g., such as when the molar ratio of alcohol-to-oil equals about 6:1), the alcohol content (e.g., moles of alcohol) remaining in the flash tank after step 140 is reduced by at least about 50 percent as compared to the material originally transferred into the reactor in step 125.

Some embodiments of the method can also include a step 145 of transferring a remaining liquid-phase content of the flash tank into a separation vessel. E.g., after substantially removing the alcohol, the remaining material from the reaction vessel is transferred from the flash tank to the separation vessel.

Some embodiments of the method can also include a step 150 of holding the remaining content in the separation vessel for a duration of time sufficient to allow the biodiesel fuel and the glycerol to substantially separate from each other.

Typically, separation in step 150 can be achieved by gravity, because glycerol has a density (e.g., about 1.3 gm/ml) that is substantially greater than the density of biodiesel (e.g., about 0.9 gm/ml). The remaining content separates into a lower layer of glycerol and upper layer of biodiesel fuel.

The duration of time needed to achieve separation in step 150 is believed to be shorter than conventional separation steps because the alcohol was substantially removed in step 140. By contrast, in some conventional processes when the alcohol is still present, at least some of the alcohol is dissolved in glycerol. This glycerol-plus-alcohol mixture has a lower density than glycerol alone, and therefore separating of the upper layer of biodiesel fuel from the lower layer of glycerol-plus-alcohol proceeds slower than embodiments where the incubation step 150 was preceded by the flashing step 140.

For instance, in some embodiments where the flashing step 140 and transfer step 145 are performed, the holding step 150 includes a separation period, by gravity, of less than 0.5 hours to achieve at least about 90 percent separation of biodiesel fuel and said glycerol (by volume) into two discernable layers.

In some embodiments, the reversal of the transesterification reaction does not substantially occur during the holding step 150. For instance, it is estimated that in some cases less than about 0.5 percent of the biodiesel fuel is lost due to the reversal of the transesterification reaction during the holding step 150. It is thought that the reverse reaction does not substantially occur because the temperature of the remaining material after removing the alcohol from the flash tank (e.g., about 20° C. lower than the reactor temperature in some cases), and subsequently transferred to the separation vessel (e.g., about 40° C. lower than the flash tank temperature in some cases), are reduced as compared to the temperature of the reaction vessel, and because the glycerol and biodiesel fuel are rapidly separated from each other in step 150. Thus, in some embodiments, the temperature of the flash tank can be about 20° C. lower than the reactor temperature, and the temperature of the separation tank can be about 40° C. lower than that in the flash tank.

In other embodiments of the method, however, the separation in step 150 can be performed directly after forming the biodiesel fuel in step 130. For instance, when the biodiesel is formed at about 20° C. in step 130, the flashing step 140 and transfer step 145 may not be performed, and the holding step 150 by gravity can include a conventional holding time of a day or more. While other methods (e.g., centrifugation, etc . . . ) could be used to speed the separation, such procedure may require additional equipment and more energy than merited.

One skilled in the art would be familiar with additional steps that the method could include, a step 155 of isolating of the biodiesel fuel after the holding period, or, a step 160 of collecting liquid alcohol that was removed in the flashing step 140.

Figure 2:
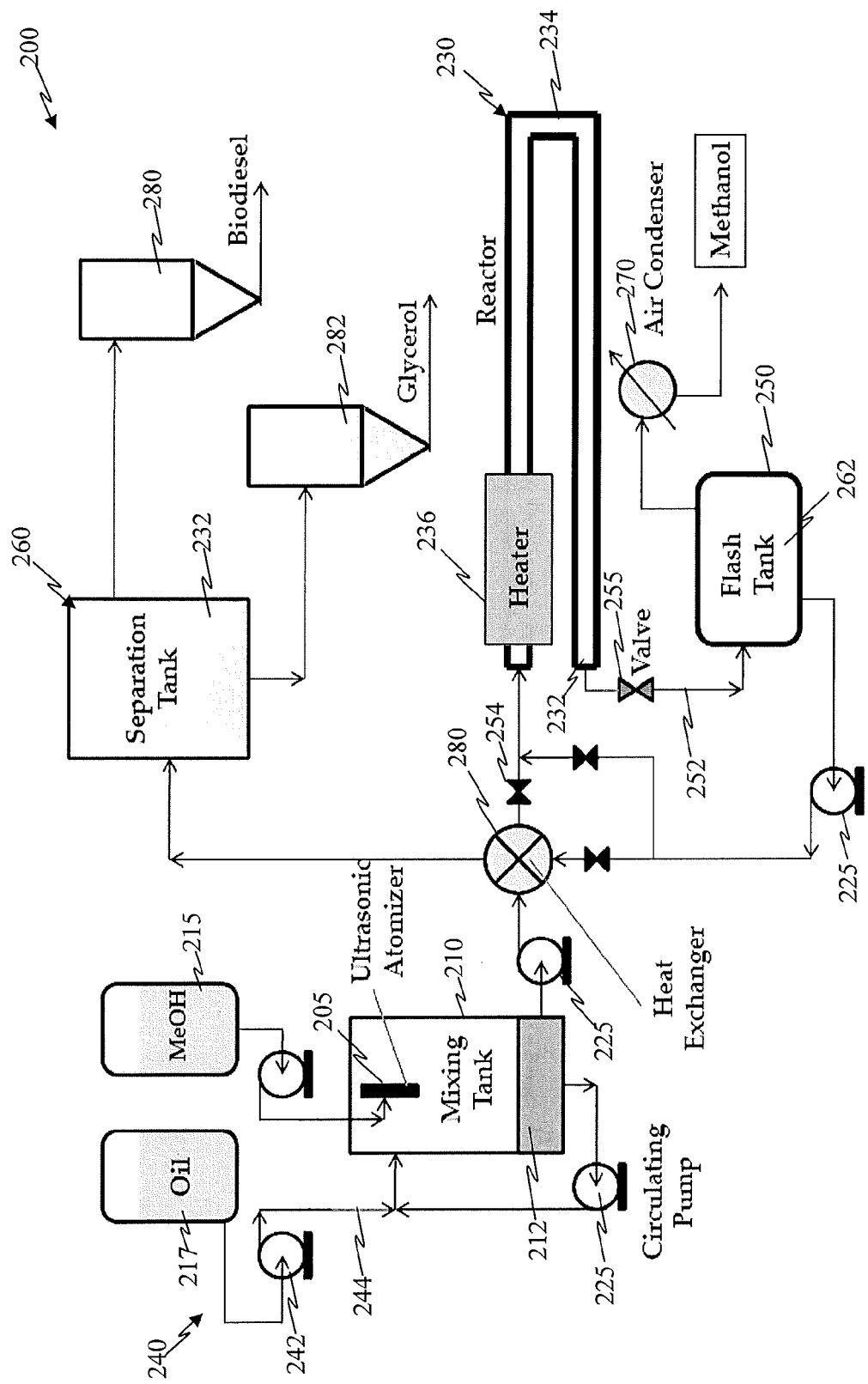
FIG. 2 presents a schematic diagram of an example system of the disclosure for manufacturing biodiesel fuel, according to the principles of the present disclosure.

Another embodiment of the disclosure is a system for manufacturing biodiesel fuel. FIG. 2 presents a schematic diagram of an example system 200 of the disclosure for manufacturing biodiesel fuel, according to the principles of the present disclosure. The system 200 comprises an atomizer 205 (e.g., ultrasonic atomizer or other atomizers) configured to generate micro-droplets from a first reactant 215 (e.g., one of an alcohol or an oil, such as methanol, "MeOH") passed through the atomizer. The system 200 also comprises a mixing vessel 210 (e.g., "Mixing Tank") configured to receive the micro-droplets of the first reactant 215 and combine the micro-droplets with a second reactant 217 (e.g., other of the oil or the alcohol, oil) to form a reactant mixture 212 (e.g., a dispersion mixture). The first reactant 215 is substantially immiscible with the second reactant 217. In the depicted system 200, an external circulating pump 225 coupled to the mixing vessel 210 facilitates the mixing. The system 200 further comprises a reaction vessel 230 (e.g., Reactor) configured to receive the reactant mixture 220 (e.g., transferred via another circulating pump 225) and convert the reactant mixture 220 into a reaction product 232 that includes a biodiesel fuel in a transesterification reaction. In the depicted system 200, the reaction vessel 230 includes or is a tubular reactor 234 and includes a heater 236. The depicted embodiment also includes a delivery system 240 (e.g., including pumps 242 and tubing 244) configured to deliver the alcohol 215 and the oil 217 to the mixing vessel 210.

Figure 3:
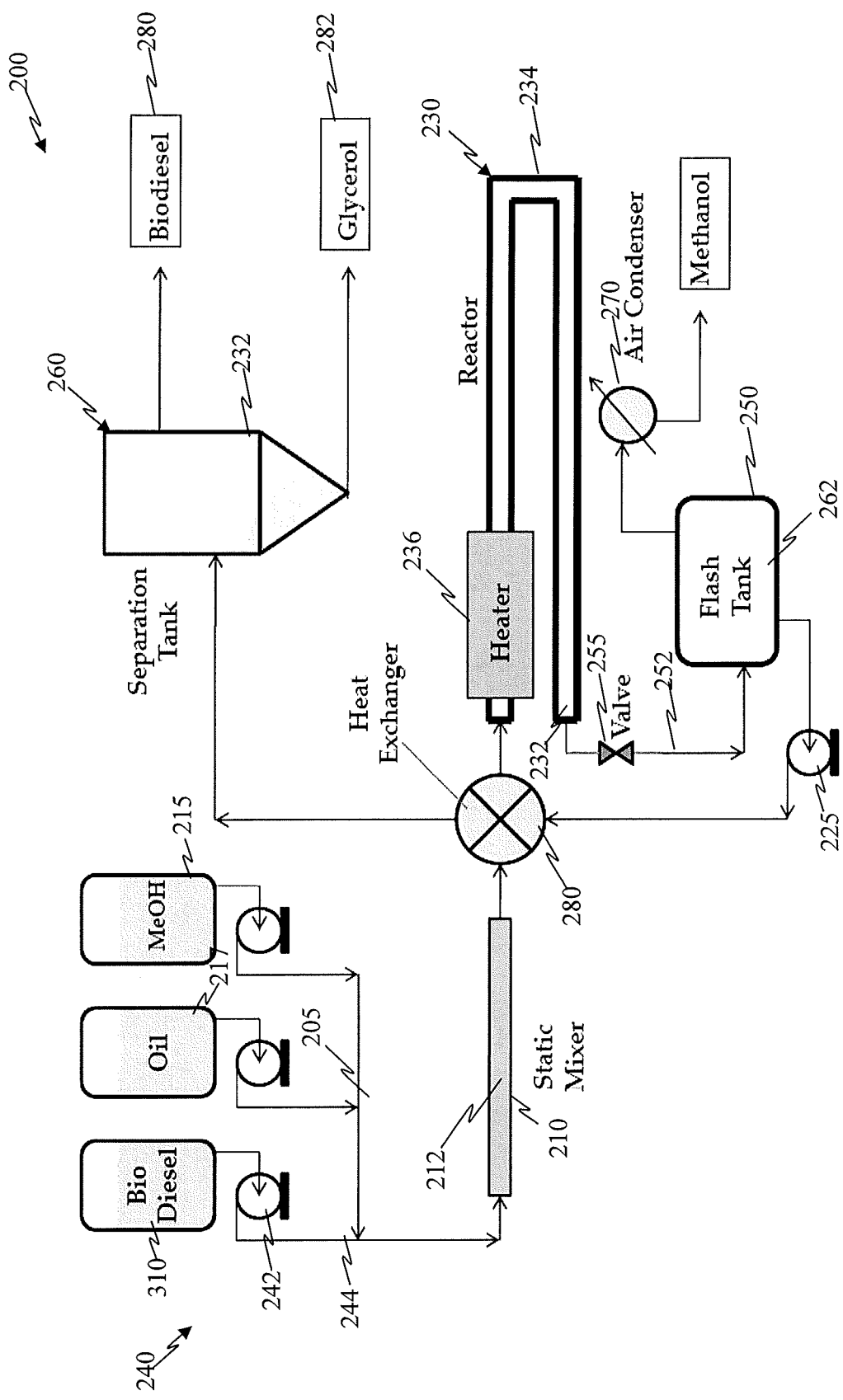
FIG. 3 presents a schematic diagram of another example system of the disclosure for manufacturing biodiesel fuel, according to the principles of the present disclosure.

FIG. 3 presents a schematic diagram of another example system 200 of the disclosure for manufacturing biodiesel fuel. The system 200 comprises a mixing vessel 210 (e.g., a static mixer) configured to form a homogeneous reactant solution 212 (e.g., a single liquid phase) of a co-solvent 310 (e.g., Biodiesel fuel), an alcohol 215 (e.g., methanol) and an oil 217. The system 200 also comprises a delivery system 240 (e.g., pumps 242 and tubing 244) configured to deliver the co-solvent 310, the alcohol 215 and the oil 217 to the mixing vessel 210. The system further comprises a reaction vessel 230 (e.g., including a tubular reactor 234, and heater 236) configured to receive the homogeneous reactant solution 212 and convert the homogeneous reactant solution 212 into a reaction product 232, that includes a biodiesel fuel, in a transesterification reaction. The alcohol 215 and the oil 217 are substantially immiscible with each other in the absence of the co-solvent 310.

FIGS. 2 and 3 also schematically illustrate aspects of another example biodiesel fuel manufacturing system 200. The example system 200 comprises a reaction vessel 230 (e.g., including a tubular reactor 232) configured to perform a transesterification reaction between a reactant mixture that includes an alcohol 215 and an oil 217. The reactant mixture 212 is maintained at a temperature that is greater than the normal boiling point of the alcohol (e.g., the normal boiling point at 1 atmosphere pressure). E.g., a heater 236 can be coupled to a portion or the entire reaction vessel 230 (e.g., a portion of the tubular reactor 234) and configured to apply heating that is sufficient to maintain the reactant mixture at a temperature level that is higher than the normal boiling point of methanol.

The system 200 also comprises a flash tank 250 fluidly coupled to the reaction vessel 230. E.g., tubing 252 and valve 255 are configured to control the pressure of the reaction vessel and to control the flow of the reacted material in the reaction vessel 230 to the flash tank 250. The flash tank 250 is configured to receive biodiesel fuel and glycerol transesterification reaction products and the remaining reactant mixture. The flash tank 250 can include a flash valve 255 configured to reduce the pressure thus facilitating flashing of vapors of the alcohol (e.g., methanol) out of the liquid in the flash tank 250. As shown for the example systems 200 in FIGS. 2 and 3 a separation vessel 260 is fluidly coupled (indirectly or directly) to the flash tank 250 (e.g., as aided with pump 225). The separation vessel 260 is configured to receive a remaining liquid content 262 of the flash tank 250 into the separation vessel 260.

In some cases, the flash tank 250 is coupled to a condenser 270 (e.g., air condenser) that is configured to condense the alcohol vapor to liquid alcohol (e.g. methanol). In some cases, the flash tank 250 is configured to pass the remaining content 262 in the flash tank 250 (e.g., the content after removing alcohol) through a heat exchanger 280 and then to the separation tank 260. The heat exchange 280 is configured to reduce the temperature of the remaining content 262 from the flash tank 250 to facilitate separation of the biodiesel fuel 280 and glycerol 282 reaction products and to deter the reversal of transesterification.

Although a number of features of the disclosed systems are separately discussed, one skilled in the art, in view of the present disclosure would understand how to combine these various features into one system.

One skilled in the art, in view of the present disclosure, would also understand how various types of biodiesel fuel could be manufactured by any of the disclosed methods or systems.

Having described certain aspects of present disclosure, it is believed that additional features will become even more apparent by reference to the following examples. It will be appreciated that the examples are presented solely for the purpose of illustration and should not be construed as limiting the disclosure. For instance, although the studies described below may be carried out in a laboratory or pilot-plant setting, based on the present disclosure one skilled in the art could adjust specific numbers, dimensions and quantities up to appropriate values for a full-scale plant setting.

EXAMPLES

Example data collected as part of the present disclosure is depicted below to illustrate aspects of the above-described methods and systems of the disclosure.

Some experiments were conducted using a laboratory-scale system that atomized a first reactant of alcohol to form micro-droplets using an ultrasonic atomizer which were sprayed into a mixing tank and mixing a second reactant of oil using a low shear impeller. The dispersion of micro-droplets of the first reactant in the second reactant was then fed to a tubular reactor where the transesterification reaction took place.

Figure 4:
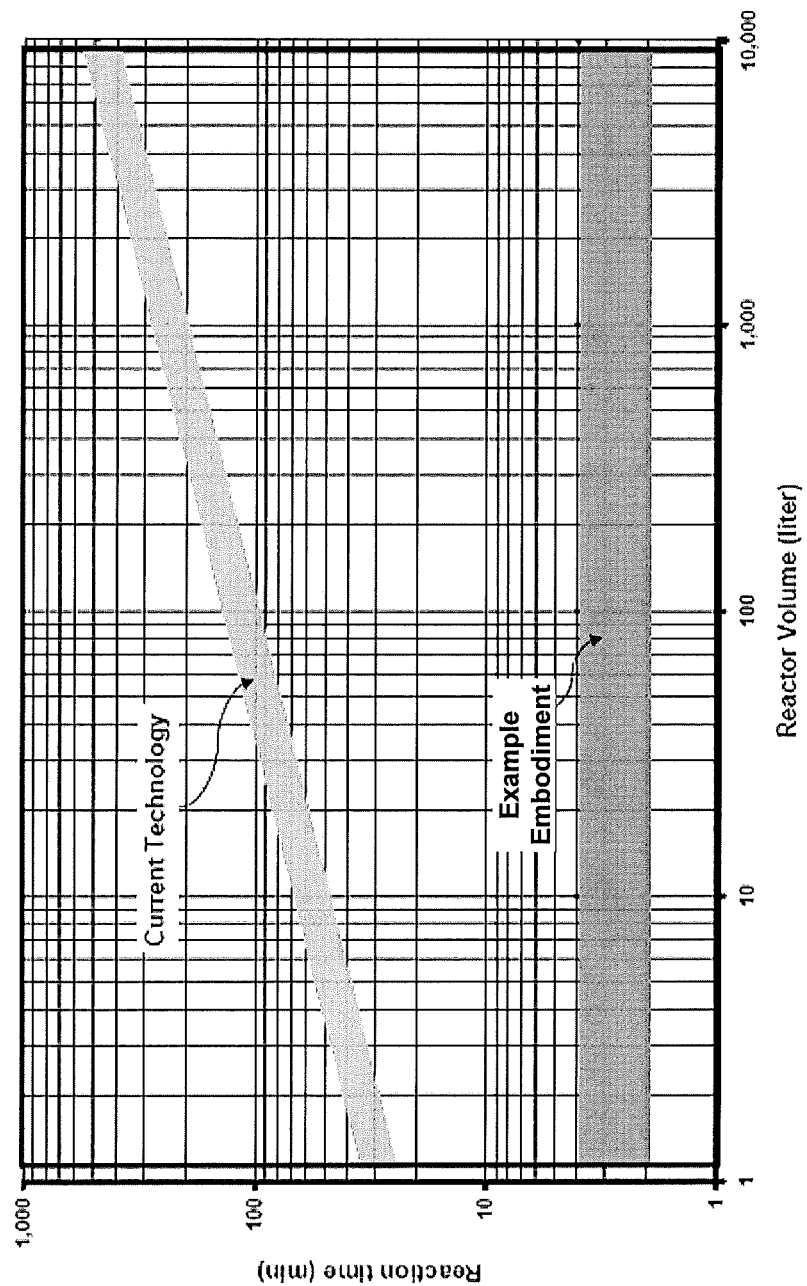
FIG. 4 shows example reactions times for substantially completing the transesterification reaction for different reactor volumes, using an example method of manufacturing a biodiesel fuel according to the principles of the present disclosure.

FIG. 4 shows the reactions times for substantially completing the transesterification reaction for different reactor volumes, using an example method of manufacturing a biodiesel fuel using the laboratory-scale system. Note that FIG. 4 depicts the reaction time, which is the inverse of the reaction rate. As shown in FIG. 4, the transesterification reaction rates obtained using the ultrasonic atomizer for a broad range of reactor volumes ("example embodiment") were faster by a factor 25 to 100 as compare to the same reaction ("Current Technology"), carried out on the same reactants under the same conditions, except using solely mechanically-mixed reactant mixtures.

Experimental pilot-plant systems were also constructed. Some experiments were conducted using a pilot-plant system equipped with an atomizer to form micro-droplets, such as discussed above in the context of FIGS. 1 and 2. In one experiment, the average flow rate of oil to the mixing tank was about 11.6 G/hr and the average flow rate of methanol (e.g., with sodium hydroxide catalyst included) was about 3.8 G/hr. The atomizer was an ultrasonic atomizer configured to operate at a vibration frequency of about 20 kHz (Sonics and Materials, Inc.; Newton, Conn.). The reaction vessel was a tubular reactor. The tubular reactor comprised an about 20 foot length of stainless steel pipe (schedule 40) having an outer diameter of about 3 inches. The first about 7 feet of the reactor was heated with electric-resistive heaters. The average reactor temperature at the outlet end of the reaction vessel was about 104° C.

The system was run a sufficient period for about 77 G of oil to pass through the reaction vessel. The amount of glycerol collected from the separation tank was about 5.5 G and the estimated conversion of oil to biodiesel fuel was estimated to be about 97%.

Figure 5:
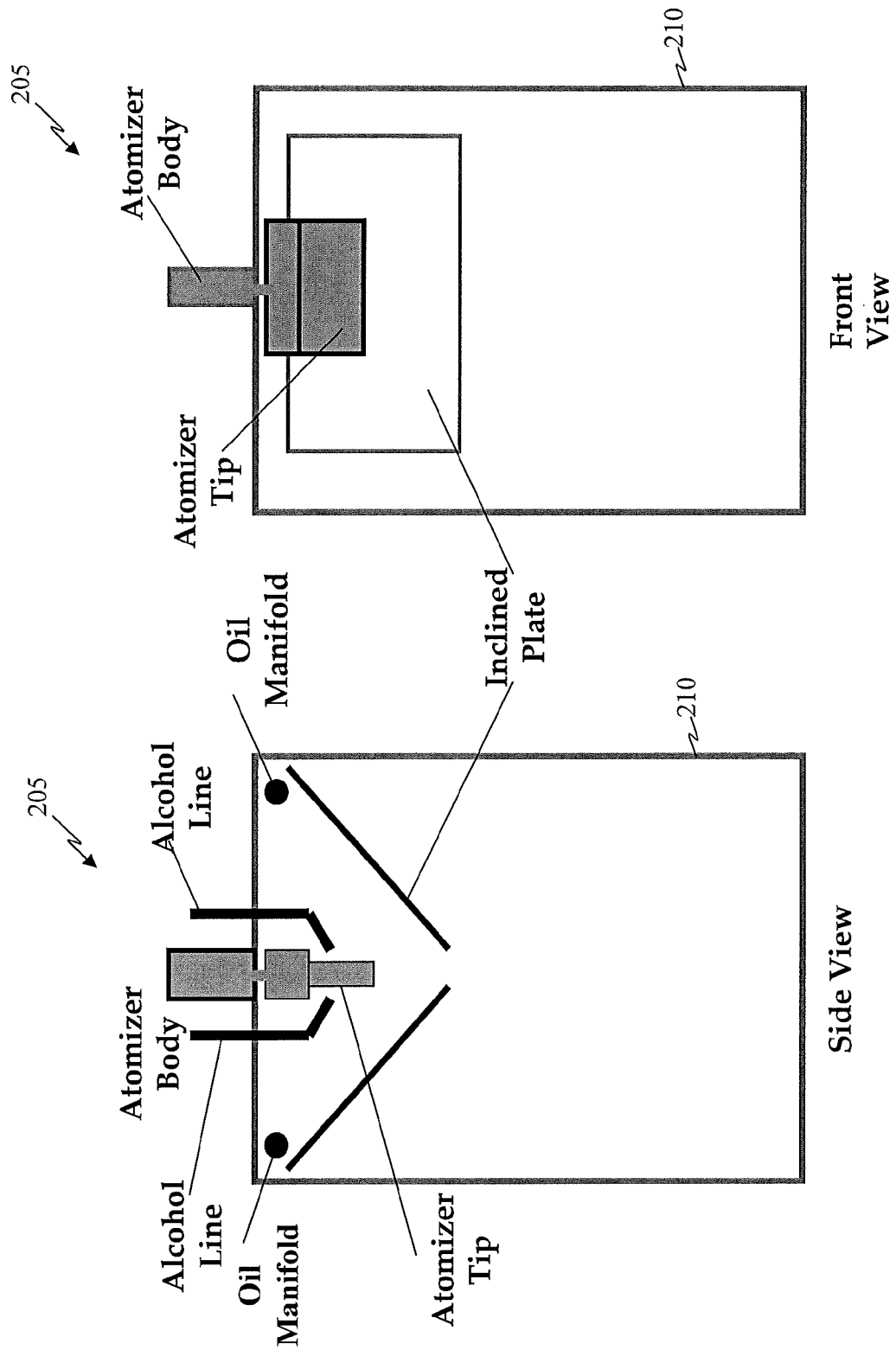
FIG. 5 shows front and side views of an example configuration of a mixing tank for contacting micro droplets of one reactant with the other reactant, such as the mixing discussed in the context of FIG. 2.

The mixing vessel comprised an about 55 gallon stainless steel barrel. A first reactant of methanol was atomized using the above-described type of ultrasonic atomizer configured to vibrate vertically in the barrel at 20 kHz. Methanol micro-droplets having an average diameter of about 40 microns were formed. The ultrasonic atomizer probe was 6 inch wide, about 4 inch tall, and the width of its tip was 0.5 inch. Methanol was introduced to the two sides of the probe by two 4-inch wide manifolds, each mounted next to the vibrating surfaces. The tip of the probe was located at about 6 inches above the intersection line of two inclined plates (see e.g., example embodiment of a mixing tank shown in FIG. 5). A two-dimensional plume of micro-droplets was generated at the tip of the probe. The plume of micro-droplets was sprayed on two thin layers of the recycling dispersion (e.g., fluid oil and alcohol micro-droplets) as the fluid move down onto two inclined plates inside the vessel. Mixing of the methanol droplets into the dispersion was achieved as the two liquid layers from the plates were merged.

The moving thin liquid layer on each inclined plate of the mixer was formed by passing the circulating fluid (from the circulating pump; see e.g., FIG. 2) through a manifold mounted at the top of the plate. To assure good mixing and feeding of the homogeneous dispersion to the reactor, the circulating flow rate of the dispersion was maintained at least 20 times higher than the flow rate of the fresh oil. E.g., in some experiments, the circulation flow rate was about 60 times the flow rate of the oil.

In one experiment, the average flow rate of oil to the mixing tank was about 7.1 G/hr (44 L/hr) and the average flow rate of methanol (with NaOH catalyst included) was about 2.5 G/hr (14 L/hr). The reaction vessel was the same as the above-described tubular reactor. The average reactor temperature at the outlet end of the reaction vessel was about 105.4° C. Average flow rate of the reactant mixture through the reaction vessel was about 20.7 gal/h The system was run a sufficient period for about 125 G of oil to pass through the reaction vessel. The amount of glycerol collected from the separation tank was about 9 G and the estimated conversion of oil to biodiesel fuel was estimated to be about 97%.

Other experiments were conducted using a pilot-plant system equipped with a mixing vessel that was configured as a static mixing vessel. The static mixing vessel was configured to form a homogenous solution of a biodiesel fuel co-solvent, an alcohol first reactant (e.g., methanol) and a second reactant of oil, without applying movable mixing features inside the vessel, such as agitators. Avoiding the need for movable mixing features is expected to facilitate making full-plant scaled versions of the system, because problems associated with mixing large volume of liquids using moving mixing features are avoided.

Although the present disclosure has been described in detail, those skilled in the art should understand that they can make various changes, substitutions and alterations herein without departing from the scope of the disclosure in its broadest form.

What is claimed is:

1. A method of manufacturing a biodiesel fuel, comprising:
generating micro-droplets of a first reactant;
mixing said micro-droplets of said first reactant with a second reactant that is substantially immiscible with said first reactant;
transferring said mixture of said first reactant and second reactant into a reaction vessel; and
forming a biodiesel fuel in said reaction vessel by a trans-esterification reaction,
wherein said first reactant is one of an alcohol or an oil, and said second reactant is the other of said oil or said alcohol.

2. The method of claim 1, wherein said micro-droplets have an average diameter in a range of about 20 to 100 microns.

3. The method of claim 1, wherein generating said micro-droplets includes stirring said mixture using a low-shear mixer.

4. The method of claim 1, wherein generating said micro-droplets includes passing a liquid of said first reactant through one of an ultrasonic atomizer, pressure atomizer or pneumatic atomizer to thereby produce said micro-droplets.

5. The method of claim 1, wherein said transesterification reaction is performed at a temperature above a normal boiling point of said alcohol.

6. The method of claim 1, further including flowing said reactant mixture through a tubular reactor of said reaction vessel at an elevated pressure.

* * * * *